3,338,781
FUNGICIDALLY ACTIVE FLUOROCHLOROCY-
CLOHEXYLCYCLOHEXENEONES AND PROC-
ESS FOR CONTROLLING FUNGUS INFESTA-
TIONS THEREWITH
Everett Eddy Gilbert, Morristown, N.J., assignor to Allied
 Chemical Corporation, New York, N.Y., a corporation
 of New York
No Drawing. Filed Feb. 4, 1966, Ser. No. 525,102
4 Claims. (Cl. 167—30)

This invention relates to new fungicidally active compounds, to fungicidal compositions containing them and to a method for controlling fungus infestations therewith.

The new compounds of my invention are hexafluoropentachlorocyclohexyl - tetrafluorotrichlorocyclohexeneones of the empirical formula $$C_{12}F_{10}Cl_8O$$

wherein the double bond of the single keto group is conjugated with respect to the single double bond of the cyclohexene ring.

The formula generic to all the isomers can be written as shown below.

wherein R is a tetrafluorotrichlorocyclohexeneone radical wherein the double bond of the single keto group is conjugated with respect to the double bond of the cyclohexene ring.

This formula thus includes the individual compounds shown below, which differ from each other in the positions of the keto group and the double bond, with corresponding shifts in the position of the halogen substituents.

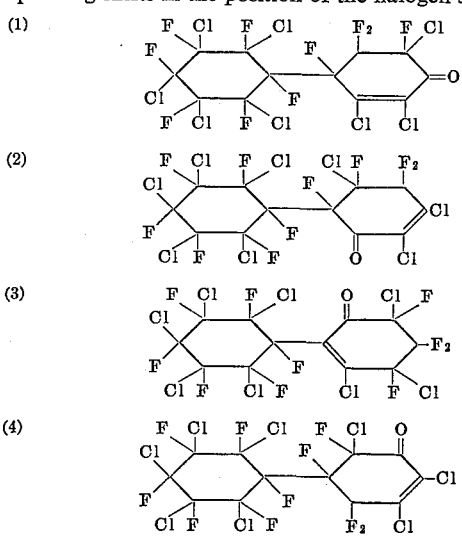

The new compounds of my invention can be prepared from the corresponding hexafluoropentachlorocyclohexyl-pentafluorotetrachlorocyclohexenes $C_{12}F_{11}Cl_9$ by reaction with sulfur trioxide in the presence of a boron compound or a pentavalent antimony compound catalyst at temperatures between about 40° C. and about 100° C. to produce the corresponding monoketone in which the double bond is in the same position as the starting material and the carbonyl group replaces the two halogen atoms on a carbon adjacent to one of the doubly bound carbons, thus rendering the double bonds of the ring and the resulting carbonyl conjugated with respect to each other.

An illustrative equation is shown below.

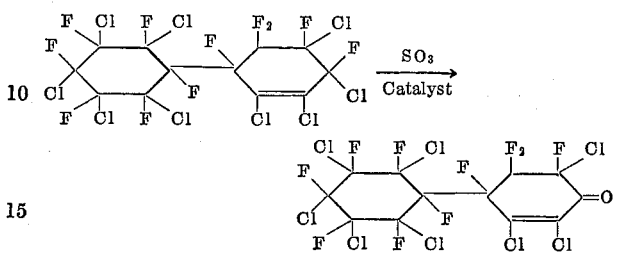

Instead of using a pure hexafluoropentachlorocyclohexylpentafluorotetrachlorocyclohexene in the reaction, mixtures of these cyclohexenes may be used, or alternatively the new compounds can be prepared from the fluorochloro-substituted dicyclic composition known commercially by the trademark "Florube No. 1" which is prepared by reacting a polychlorobiphenyl with chlorine trifluoride to replace substantially all the hydrogen atoms with fluorine and to saturate all but one of the double bonds of the benzene rings. The resulting product is a mixture of hexafluoropentachlorocyclohexyltetrafluorotrichlorocyclohexenes with a trace of hydrogen-containing isomers of the approximate empirical formula $$C_{12}H_{0.2}Cl_{8.5}F_{10.7}$$

and a molecular weight of about 650.

The hexafluoropentachlorocyclohexyl-pentafluorotetrachlorocyclohexenes and their mixtures used as starting materials herein whether pure or in the form of the commercial "Florube No. 1" product, have very high thermal and chemical stabilities such that they resist the action of fuming nitric acid and concentrated sulfuric acid at 100° C. and are miscible with SO₃ at room temperature without reaction. Notwithstanding this general nonreactivity of these fluorochlorobicyclic compounds, I have found that they react readily with sulfur trioxide at reflux temperatures and higher, in the presence of boron compounds and pentavalent antimony compounds.

In preparing the new ketones of my invention, the appropriate hexafluoropentachlorocyclohexyl-pentafluorotetrachlorocyclohexene, or a mixture of position isomers is mixed with sulfur trioxide, preferably liquid sulfur trioxide, the latter being used in proportions at least stoichiometrically equivalent to the cyclohexene derivative, together with the catalyst. The mixture is heated to reflux (44.5° C.) and heating is continued, preferably at increasing temperatures up to about 100° C. or higher, and heating is further continued for sufficient time to produce the desired or maximum yield of ketone product. The resulting oily product is diluted with hot (90–100° C.) water to hydrolyze the intermediate sulfonation product to the ketone and separate excess SO₃ from the product.

The mixture is then cooled, the water layer separated from the product oil layer, which is then dried.

A catalyst is essential for the reaction of my invention. In general, boron compounds and pentavalent antimony compounds are suitable as catalysts. Examples of boron compound catalysts which can be used are boric oxide, trimethylboroxine, borax, sodium and potassium fluoborates, methyl borate, boric bromide, boric iodide, boric carbide, boric chloride, boric fluoride, boric hydride, boric nitride, boric silicide, and boric sulfide. Boric oxide is preferred. Examples of the pentavalent antimony compounds which can be used are antimony pentachloride, antimony pentafluoride, antimony pentabromide, and antimony pentaiodide.

Catalyst can be present in amounts sufficient to promote the reaction, preferably in the range between about 1% and about 20% by weight based on the weight of the $SO_3$ used. The whole amount of the catalyst can be added initially or a portion initially and the balance during the reaction.

The amount of $SO_3$ used is at least about the stoichiometric equivalent of the fluorochlorocyclohexylcyclohexene reactant. Preferably a stoichiometric excess of $SO_3$ will be used.

Reaction is preferably carried out at temperatures between the reflux temperature of $SO_3$ (B.P. 44.5° C.) with increase in temperature to about 100° C. as the reaction proceeds.

Heating at the reaction temperature is continued until the desired yield of product has been obtained, usually between about 1 hour and about 24 hours and is preferably followed by an hydrolysis step with water.

The new ketones of my invention are viscous oily liquids. They have boiling ranges between about 250° C. and about 400° C. They are insoluble in water, but soluble in the common organic solvents such as acetone, xylene, etc.

The infrared spectrograms of the several isomers are similar and all have strong absorption peaks at a wave length of 5.7 microns. In this respect they differ from the starting cyclohexenes from which they are prepared. The new ketone compounds also have a characteristic absorption band between 8 and 9 microns, in the form of a doublet with peaks at 8.3 and 8.8 microns respectively, and a characteristic peak at 11 microns and share these later characteristics with the starting material fluorochlorocyclohexenes.

In contrast to the starting materials the new hexafluoropentachlorocyclohexyl - tetrafluorotrichlorocyclohexene-ones of my invention are highly chemically reactive and react readily at the site of the reactive chlorine attached to the doubly bound ring carbon farthest removed from the ketone group.

The new ketones of my invention and mixtures thereof are active fungicides and are especially useful and effective in combatting fungus infestations on plants, particularly in controlling apple scab, *Venturia inaequalis.*

Although the compounds of the present invention are useful per se in combatting fungi, it is preferred that the compounds be supplied to the fungus or to the environment or host of the fungus in conjunction with a major proportion of a carrier which may be a solid, liquid or gaseous material, the invention compounds constituting the toxic ingredient of such compositions. The toxicant compounds may be employed either in the form of aqueous sprays or dust compositions and the amount of toxicant used in combatting the fungi may vary considerably provided a sufficient quantity is used to provide the desired toxicity.

When employed in the form of a powder or dust for killing fungi, the toxicant compounds may be mixed with a substantial portion of any suitable inert material or diluent, preferably in finely divided form, such as known grades of prepared parasiticide carrier clays, pyrophyllite, fuller's earth, bentonite, sulfur, lime, talc, whiting, diatomaceous earth, etc. Suitable dusts of this type usually contain not less than 0.5% and preferably not less than 5% by weight of toxicant.

Liquid pesticide sprays containing the toxicants of this invention may be prepared by first forming a solution of the compound in a suitable organic solvent, e.g., xylene, methylated naphthalenes, acetone, hexane, dioxane, methyl ethyl ketone, solvent naphtha or any highly aromatic petroleum type parasiticide oil, and preferably adding a small amount of emulsifying agent commonly employed in the art such as diglycol oleate, p-isooctyl phenyl ether of polyethylene glycol, sodium decylbenzene sulfonate and sodium dodecylbenzene sulfonate. The resulting concentrate solution, usually containing about 2 to 8 pounds of the toxicant per gallon, is incorporated with water in quantity sufficient to form an aqueous dispersion or emulsion having the desired active ingredient concentration.

In a preferred embodiment, aqueous spray dispersions may be formed by incorporating in water dry mixtures or so-called wettable spray powders containing the toxicants of the invention, generally in an amount of about 15 to 25 weight percent, based on the weight of the powder. These mixtures may also include inert diluents, suitable quantities of wetting and dispersing agents and, if desired, secondary toxicants.

The aqueous spray dispersions of the invention preferably should contain the active ingredient in an amount not less than ¼ of an ounce per 100 gallons of spray, the more usual concentration being in the range of ¼ to 2 pounds per 100 gallons of spray.

The toxicant compounds of this invention are extremely toxic when used as a fungicide for killing fungi which invade plants. In such use, the toxicant, with or without a suitable carrier or diluent, can be applied to the fungus or to the growing plants to be protected.

The following specific examples further illustrate the invention. Parts are by weight except as otherwise noted.

*Example 1*

Fourteen grams (0.025 mole) of a commercial mixture of hexafluoropentachlorocyclohexylpentafluorotetrachlorocyclohexenes (Florube No. 1) with an empirical formula of approximately $$C_{12}H_{0.2}Cl_{8.5}F_{10.7}$$

and a calculated molecular weight of 650 was mixed with 5 grams (0.062 mole) of stabilized liquid sulfur trioxide and 2 grams of $SbCl_5$ and heated on a steam bath. The mixture refluxed briskly at the initial temperature of about 45° C. The rate of reflux slowly decreased as the temperature of the mixture gradually rose to 100° C. as reaction occurred. Heating at 100° C. was continued for 24 hours. The resulting reaction mixture was a red oil which weighed about 0.5 to 1.0 gram less than that of the total reagent input. At this point 200 ml. of hot (90° C.) water was added, and the mixture was stirred at 100° C. for 4 hours during which time reaction between the water and oil layers was noted, indicating hydrolysis of possible sulfated intermediate compounds. The mixture was then cooled and the oil layer was separated. It was dried and yielded 11 grams of a viscous product which analyzed 32% fluorine as compared to 33.8% fluorine in the starting material, an indication that an average of about one fluorine atom per molecule had been replaced.

An infrared spectrogram run on the product was similar to that of the starting material except that it showed a strong carbonyl absorption at 5.7 microns in contrast to the starting material whose infrared spectrogram showed no absorption at this wave length, thus indicating that the product was the desired hexafluoropentachlorocyclohexyl-tetrafluorotrichlorocyclohexeneone.

*Examples 2–5*

Additional runs were made in which $SO_3$ was reacted with the same hexafluoropentachlorocyclohexyl-pentafluorotetrachlorocyclohexene ("Florube No. 1") used in Example 1 and in the same general manner, with the variations in conditions and results shown in Table I below.

| Example No. | Florube, grams | SO₃, grams | Catalyst | | | Hours Heated | Grams Product |
|---|---|---|---|---|---|---|---|
| | | | Type | Grams | Wt. percent on SO₃ | | |
| 1 | 14 | 5 | SbCl₅ | 2.0 | 40 | 24 | 11 |
| 2 | 14 | 5 | B₂O₃ | 0.5 | 10 | 24 | 11.5 |
| 3 | 35 | 13 | SbCl₅ | 0.5 | 4 | 72 | 30 |
| 4 | 10 | 15 | SbCl₅ | 5.0 | 33.3 | 4 | 5.2 |
| 5 | 14 | 5 | None | None | 0 | 24 | None |

It will be noted from Table I that in the absence of catalyst (comparative Example 5) no reaction product was obtained after 24 hours of heating. Yields of desired ketone product are good with catalyst concentrations as low as 4% based on SO₃ (Example 3), and heating times of 24 hours or more (Examples 1–3). However, even with a high catalyst concentration of 33.3% based on SO₃ (Example 4) a heating time of 4 hours was insufficient to produce the maximum yield of product.

*Example 6*

An acetone solution was prepared containing 10 parts per million of the hexafluoropentachlorocyclohexyltetrafluorotrichlorocyclohexeneone prepared in Example 1. Samples of this solution were placed in depressions in glass slides. Two drops of a standard spore suspension of apple scab fungus (*Venturia inaequalis*) was added to the test mixtures. The slides were placed in a petri dish chamber containing 5 ml. of water and were incubated at room temperature for 24 hours. The slides were then examined microscopically and were observed to have no spores germinated. Thus the hexafluoropentachlorocyclohexyl-pentafluoro-tetrachlorocyclohexeneone compound was rated effective to completely control apple scab under the test conditions.

While the above describes the preferred embodiments of my invention, it will be understood that departures can be made therefrom within the scope of the specification and claims.

I claim:

1. A hexafluoropentachlorocyclohexyl-tetrafluorotrichlorocyclohexeneone of the formula

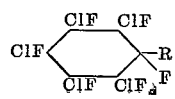

wherein R is a tetrafluorotrichlorocyclohexeneone radical selected from the group consisting of

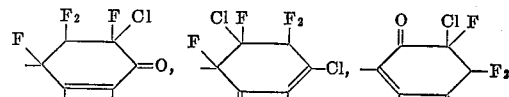

and

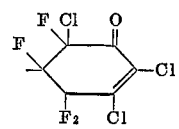

2. A composition comprising a mixture of at least two isomeric hexafluoropentachlorocyclohexyltetrafluorotrichlorocyclohexeneones of claim 1.

3. A fungicidal composition comprising a mixture of at least two isomers of the compound of claim 1 together with a dispersing agent and an inert fungicidal adjuvant therefor.

4. A process for controlling apple scab which comprises applying to *Venturia inaequalis* a fungicidally effective amount of at least one compound of claim 2.

References Cited

UNITED STATES PATENTS 2,657,126  10/1963  Stewart _____ 260—586

ALBERT T. MEYERS, *Primary Examiner.*

S. FRIEDMAN, *Assistant Examiner.*

UNITED STATES PATENT OFFICE

CERTIFICATE OF CORRECTION

Patent No. 3,338,781                                        August 29, 1967

Everett Eddy Gilbert

It is hereby certified that error appears in the above numbered patent requiring correction and that the said Letters Patent should read as corrected below.

Column 6, lines 16 to 20, the extreme right-hand side of the formula should appear as shown below instead of as in the patent:

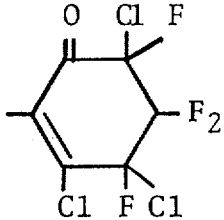

Signed and sealed this 30th day of July 1968.

(SEAL)
Attest:

Edward M. Fletcher, Jr.                              EDWARD J. BRENNER

Attesting Officer                                        Commissioner of Patents